(12) United States Patent
Adarve Lozano

(10) Patent No.: US 10,498,957 B2
(45) Date of Patent: *Dec. 3, 2019

(54) VIEWING SYSTEM FOR IN-FLIGHT REFUELLING

(71) Applicant: Alberto Adarve Lozano, Madrid (ES)

(72) Inventor: Alberto Adarve Lozano, Madrid (ES)

( * ) Notice: Subject to any disclaimer, the term of this patent is extended or adjusted under 35 U.S.C. 154(b) by 74 days.

This patent is subject to a terminal disclaimer.

(21) Appl. No.: 15/125,354

(22) PCT Filed: Mar. 11, 2015

(86) PCT No.: PCT/ES2015/070173
§ 371 (c)(1),
(2) Date: Sep. 12, 2016

(87) PCT Pub. No.: WO2015/136139
PCT Pub. Date: Sep. 17, 2015

(65) Prior Publication Data
US 2017/0078569 A1 Mar. 16, 2017

(30) Foreign Application Priority Data
Mar. 12, 2014 (ES) .................................. 201400196

(51) Int. Cl.
*B64D 47/08* (2006.01)
*H04N 5/232* (2006.01)
(Continued)

(52) U.S. Cl.
CPC ......... *H04N 5/23238* (2013.01); *B64D 39/06* (2013.01); *B64D 47/08* (2013.01);
(Continued)

(58) Field of Classification Search
CPC ........ B64D 39/00; B64D 39/06; B64D 47/08; G03B 15/006; G03B 35/08; G03B 37/00;
(Continued)

(56) References Cited

U.S. PATENT DOCUMENTS 9,369,689 B1* 6/2016 Tran ........................ G06T 7/593
9,817,298 B1* 11/2017 Dhall ..................... G03B 17/02
(Continued)

FOREIGN PATENT DOCUMENTS

WO 2009082400 A1 7/2009
WO WO 2009082400 * 7/2009 ............. B64D 39/00

OTHER PUBLICATIONS

International Search Report; dated Apr. 27, 2015, 2 Pages.

*Primary Examiner* — James T Boylan
(74) *Attorney, Agent, or Firm* — William H. Honaker; Dickinson Wright PLLC

(57) ABSTRACT

A complete or global monitoring and illumination system installed externally on a single point on the aircraft, on a platform that would be called the "base platform", which includes all the light outlets and all the cameras required for monitoring refuelling operations from a single point on the fuselage. The system is placed in the lower part, under the axis of the fuselage and simultaneously reduces the time required for installation and makes installation less expensive. Thus, assembly or dismantling of the system involves this single structure that includes all that is required for providing the aircraft with a complete viewing system for monitoring in-flight operations.

4 Claims, 1 Drawing Sheet

(51) Int. Cl.
*G03B 15/00* (2006.01)
*B64D 39/06* (2006.01)
*H04N 5/225* (2006.01)
*H04N 13/239* (2018.01)
*B64D 39/00* (2006.01)
*G03B 35/08* (2006.01)
*G03B 37/00* (2006.01)

(52) U.S. Cl.
CPC .......... *G03B 15/006* (2013.01); *H04N 5/2256* (2013.01); *H04N 5/23216* (2013.01); *H04N 5/23296* (2013.01); *H04N 13/239* (2018.05); *B64D 39/00* (2013.01); *G03B 35/08* (2013.01); *G03B 37/00* (2013.01)

(58) Field of Classification Search
CPC ............. H04N 13/0239; H04N 5/2256; H04N 5/23216; H04N 5/23238; H04N 5/23296
USPC .................................................... 348/144, 48
See application file for complete search history.

(56) References Cited

U.S. PATENT DOCUMENTS

| | | | |
|---|---|---|---|
| 2002/0093564 A1* | 7/2002 | Israel | H04N 7/106 348/145 |
| 2010/0045544 A1* | 2/2010 | Maurel | G01S 7/03 343/705 |
| 2010/0256838 A1 | 10/2010 | Stecko et al. | |
| 2011/0147529 A1* | 6/2011 | Adarve Lozano | B64D 39/00 244/135 A |
| 2011/0261188 A1* | 10/2011 | Adarve Lozano | B64D 39/00 348/122 |
| 2012/0105574 A1* | 5/2012 | Baker | G03B 35/08 348/36 |
| 2012/0290170 A1 | 11/2012 | Yague Martine et al. | |
| 2015/0348580 A1* | 12/2015 | van Hoff | G11B 19/20 348/38 |

* cited by examiner

VIEWING SYSTEM FOR IN-FLIGHT REFUELLING

CROSS REFERENCE TO RELATED APPLICATIONS

This application claims the benefit of PCT International Application Serial No. PCT/ES2015/070173, filed on Mar. 11, 2015, which claims priority to Spanish Patent Appln. No. 201400196, filed on Mar. 12, 2014. The entire disclosures of these applications are incorporated by reference.

TECHNICAL FIELD

The present invention relates to a viewing system for in-flight refuelling, specifically designed to allow for supervision of the work environment during refuelling tasks, in order to make them comfortable, safe operations.

The object of the invention is to provide a single-platform global viewing system to perform in-flight refuelling between air vessels or aeroplanes.

BACKGROUND OF THE INVENTION

Currently, when it is necessary to perform in-flight refuelling or similar operations, it is necessary to use a viewing system that makes it possible to supervise the work environment in order to guarantee comfortable, safe operations. This viewing system is made up of a set of cameras and lighting devices dispersed throughout various sites on the exterior of the aeroplane.

As the number of different sites containing elements of the system increases, the installation thereof becomes more costly, since more tasks are required in order to adapt the exterior of the aeroplane to the desired configuration; more wiring must be set up in the aeroplane and more problems arise when changing the aeroplane's configuration to a different one.

The background of the invention includes publication nos. EP 2336028 A1 and EP 2336027 A1, by the same inventor, which disclose a viewing system with the same objectives that fulfils the characteristics described in the first section of this document, but wherein the elements are not arranged in a single block or platform, and, therefore, has the aforementioned disadvantages.

SUMMARY OF THE INVENTION

The system proposed herein is conceived to resolve the problems exposed above; to this end, all the elements involved in the system that are applicable to the aeroplane form a single set, even though the wiring is redundant, which allows for replacement of the entire system or the disassembly thereof for calibration, tune-up, repairs, etc.

I.e., according to the invention, this is a single system formed by one block that incorporates all the elements involved therein, in order to achieve an exterior view when applied to the aeroplane.

Specifically, the system of the invention, which forms a single block that allows for efficient, safe operation based on good visibility of the operating environment, is made up of a support structure which is attached to the aeroplane, the structure being supplemented with a fairing that improves the aerodynamics of both the system and the components thereof.

The system proposed herein has 3D panoramic vision and makes it possible to perform inspection tasks by using a zoom. It also provides all the lighting that the system needs when used at night. The system must be supplemented with an internal system wherein the images and the rest of the data collected are processed, in the broadest sense of the word (selection, routing, compression, encryption, decryption, decompression, treatment, enhancement, clarification, improvement, stabilisation, recognition, structuring, recording, reproduction, etc.), in order to be finally shown in one or more monitors or displays.

It comprises a set of cameras composed of three sub-systems: The 3D cameras, which are made up of two cameras placed in the front of the block, with the potential for day and night 3D vision. They are placed on both sides of the axis of the aeroplane in the direction of flight and at equal distances therefrom on the left and right sides. The distance between them will determine the depth-of-field perception sensitivity and must allow for adequate information about the distances. Moreover, the sub-block that contains them may be regulated by the operator during the flight.

Behind the 3D cameras, there are two domes with zoom capability, focusing ability and the capacity for horizontal and vertical motion, which not only allow for detailed inspection, but, moreover, may generate an auxiliary 3D image in the event of failure of the main sub-system or any of the components thereof. The arrangement is such that they do not interfere with any of the elements that make up the rest of the viewing system. They are beneath the 3D cameras and behind them in the direction of flight. Thus, they may provide information about any of the refuelling operations, whether boom or hose refuelling operations.

On the longitudinal axis, a panoramic viewing system is placed which is based on a mechanism similar to that of patents US 20130208083 A1 and WO 2013054252 A1. Its mission is to provide a peripheral panoramic view of the work area. The placement of this sub-system prevents geometric interference with any of the remaining elements in the main operating area. It is placed at the centre of the platform and beneath all the cameras placed thereon, as well as behind the 3D cameras in the direction of flight, although not in such a way that the latter cannot see it.

The lighting sub-system includes one or more lighting elements on each side of the block, designed to illuminate the different areas wherein the different operations take place around the aeroplane. The elements may be similar to those described in U.S. Pat. No. 7,964,847 B2 and US 20110266457 A1, by the same inventor, or be formed by LED arrays with different wavelengths for daytime and night-time operations.

The system described may or may not include mechanical or electronic stabilisation elements, including an electronic system for the collection and management of the information acquired by the set of external elements, such that the electronic system will include, among other functions, image multiplexing and processing, as well as recording and reproduction of the data collected, to be shown on monitors or displays; the arrangement of the cameras and the viewing angles thereof is such that the portion of said cameras that is seen by the others does not interfere with the operation, acting as a reference within the work environment to visually obtain location data about the aeroplanes involved in the refuelling operation.

The support structure of the system will be placed on, and attached to, the lower part of the aeroplane, such that all the necessary equipment or elements to perform the refuelling and rearming operations, and other critical operations, whether or not they are similar, may be placed on or attached to said structure.

The system may be equipped solely with the 3D viewing system, or equipped solely with the panoramic video system, designed to obtain a field of view of over one hundred degrees around the aeroplane on any of the axes thereof, or be equipped solely with the inspection system based on one or more cameras with horizontal and vertical motion, a zoom and focusing.

Finally, the system may include the necessary lights to illuminate the work area in order to perform critical tasks, such as in-flight refuelling.

DESCRIPTION OF THE DRAWINGS

In order to supplement the description made below, and to contribute to a better understanding of the characteristics of the invention, according to a preferred embodiment thereof, a set of drawings is attached to said description as an integral part thereof, where the following is represented for illustrative, non-limiting purposes.

DESCRIPTION OF THE PREFERRED EMBODIMENT

Figure 1:
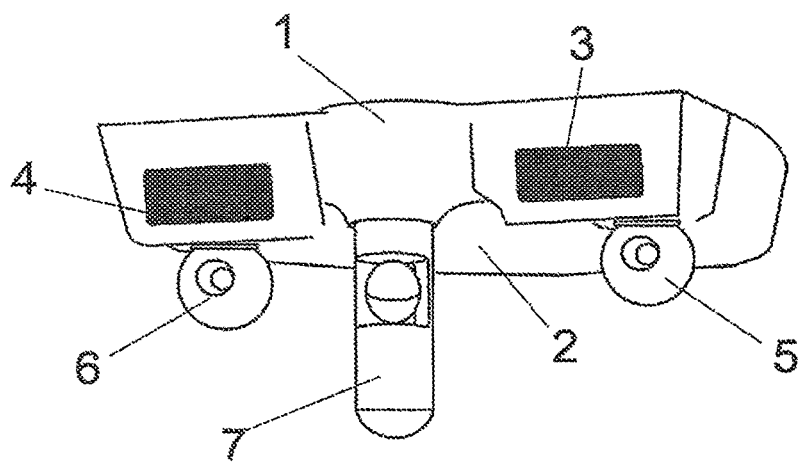
FIG. 1 shows a representation of a general perspective view of the system of the invention.
Figure 2:
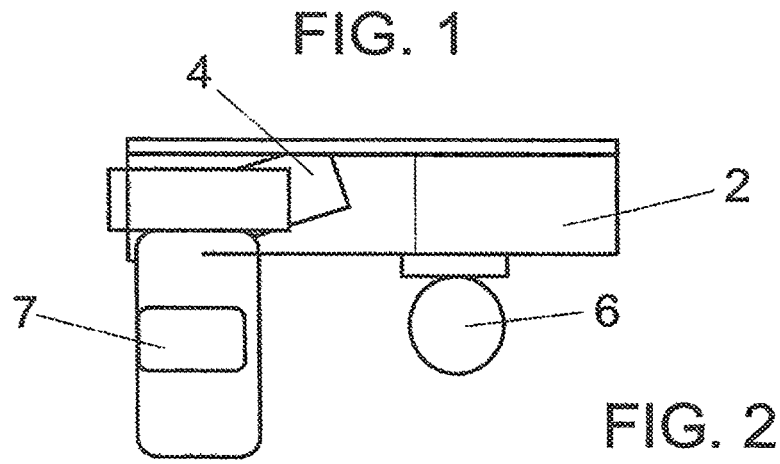
FIG. 2 shows a profile view of the same system represented in the preceding figure.

As may be seen in the aforementioned figures, the system of the invention comprises a support structure (1) for the entire set of elements involved therein, the system being attached and held on to the lower part of the corresponding aeroplane through said structure (1), supplemented with a fairing (2) that encompasses said structure (1).

Two sub-systems (3) and (4) are placed on the same structure, which correspond to two cameras located on the left and right sides, respectively, designed for the generation of 3D views.

On the other hand, it includes another pair of sub-systems (5) and (6) with cameras equipped with horizontal and vertical motion, as well as zoom and focusing, for both 2D and 3D peripheral inspection.

It also includes a redundant panoramic viewing system (7), which makes it possible to have a 2D or 3D view of the entire work environment around the global viewing system.

Figure 3:
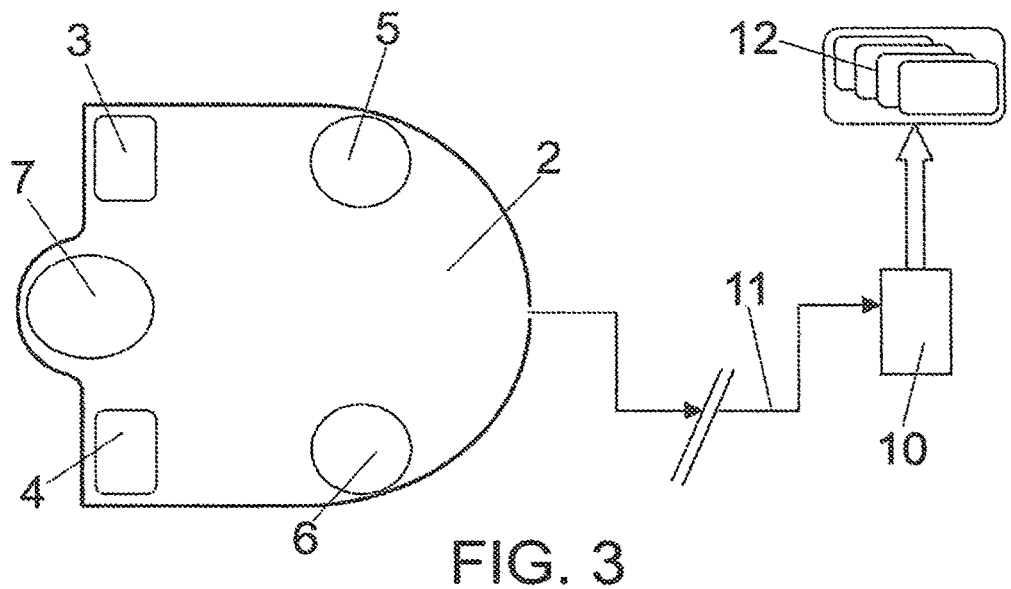
FIG. 3 shows a top view of the aforementioned system.

The aforementioned set of elements and components make up the exterior system, which will be supplemented with an internal electronic system (10), designed to collect and manage the information acquired by the elements of the exterior set described above. I.e. all the elements described above will be connected to the internal system (10) through the lines represented by (11) in FIG. 3, in order to perform management tasks on the data received, such as recording, reproduction, selection, routing, treatment, compression, encryption and, in general, all processing of the data received, to be sent to the corresponding monitors or displays (12), which are logically located inside the aeroplane, where the operator needs to supervise the images and other results.

What is claimed is:

1. A viewing system for in-flight refueling, which defines a global viewing and lighting system that allows for in-flight refueling between air vessels or aeroplanes, the viewing system comprising:

a single structure with aerodynamic fairing being held on and attached to a lower part of one of the aeroplanes, the single structure having a top surface connected to the aeroplane, a flat bottom surface opposite the top surface, left and right side surfaces opposite one another, a flat front surface and a back surface opposite the front surface;

a pair of first cameras located on the flat front surface adjacent to the left and right side surfaces of the single structure, respectively, and configured to generate 3D views;

a pair of second cameras positioned on the flat bottom surface of the single structure, each adjacent to one of the left and right side surfaces, and below and behind the pair of first cameras relative to a direction of flight such that the pair of second cameras do not interfere with the pair of first cameras, wherein the pair of second cameras are equipped with horizontal and vertical motion, zoom and focusing, wherein the pair of second cameras are designed for both 2D and 3D peripheral inspection, and wherein the pair of second cameras are configured to generate an auxiliary 3D image in the event of failure of the pair of first cameras;

a panoramic viewing sub-system located at a center of the single structure between the second pair of cameras and beneath the pair of first cameras and the pair of second cameras and presenting a 360° field of vision around the aeroplane, wherein the panoramic viewing sub-system make it possible to obtain a 2D or 3D view of the entire work environment around the entire viewing system; and wherein the viewing system includes an internal electronic sub-system that processes all the data acquired and is interconnected with the first and second cameras and the panoramic viewing sub-system through wiring, in order to process the data received and represent the data in monitors or displays.

2. A viewing system for in-flight refueling, as set forth in claim 1 further including lighting means mounted on the single structure and configured to illuminate a work area.

3. A viewing system for in-flight refueling as set forth in claim 1 further including a motorized system on a pan axis and a tilt axis and connected to the second pair of cameras and designed for adjustment on a horizontal plane and on an inclined plane, respectively, during the flight, in order to adjust the convergence point of the second pair of cameras which generate 3D views to a point of contact of a boom refueling operation.

4. A viewing system for attachment to a first aeroplane for providing viewing of a second aeroplane during in-flight refueling of the second aeroplane, the viewing system comprising:

a support structure having a top surface for being attached to a lower part of the aeroplane, a flat bottom surface opposite the top surface, a flat front surface, a back surface opposite the flat front surface, and two side surfaces extending between the top, flat bottom, flat front and back surfaces;

the support structure having aerodynamic fairing;

a pair of first cameras positioned along the flat front surface of the support structure, each adjacent to one of the side surfaces, the first cameras configured to generate 3D views of the second aeroplane;

a pair of second cameras positioned along the flat bottom surface, each adjacent to the back surface and one of the side surfaces, and positioned below the pair of first cameras in a direction away from the bottom surface, the second cameras horizontally and vertically moveable and configured to zoom and focus for 2D and 3D peripheral inspections of the second aeroplane;

a panoramic viewing sub-system positioned along the flat bottom surface between the first cameras, and below the pair of first and second cameras in the direction away from the bottom surface and presenting a 360 degree field of vision; and an internal electronic sub-system connected to the first and second cameras and the panoramic viewing sub-system through wires and configured to process data acquired from the first and second cameras and the panoramic viewing sub-system and to present the acquired data in displays.

* * * * *